Patented Oct. 21, 1952

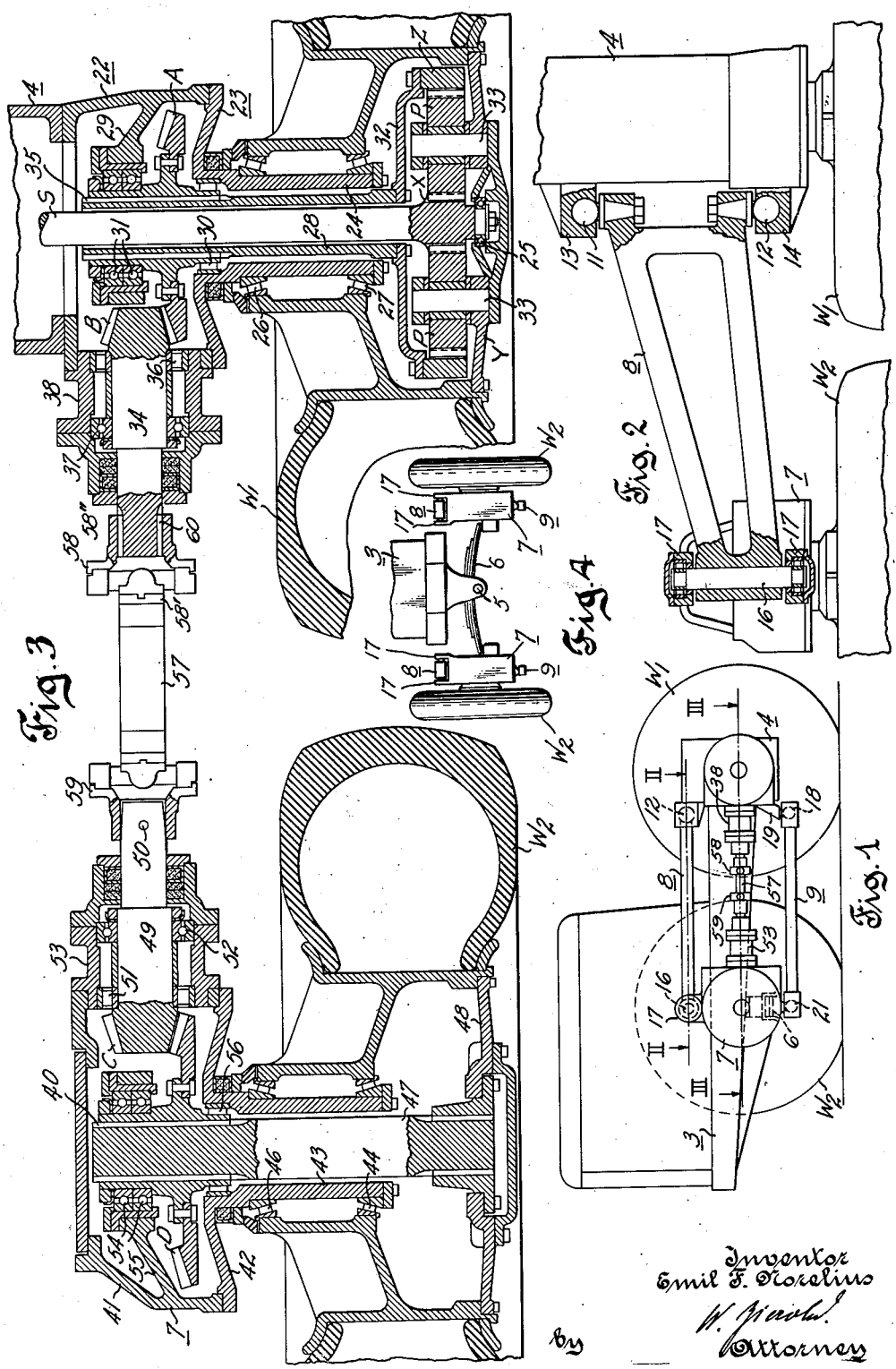

2,614,641

UNITED STATES PATENT OFFICE 2,614,641

MOUNTING FOR VERTICALLY MOVABLE TANDEM WHEELS

Emil F. Norelius, Springfield, Ill., assignor to Allis-Chalmers Manufacturing Company, Milwaukee, Wis., a corporation of Delaware Original application March 25, 1949, Serial No. 83,361. Divided and this application December 14, 1949, Serial No. 132,939

7 Claims. (Cl. 180—1)

The invention relates to vehicle running gear and it is concerned more particularly with an improved tandem drive mechanism for motor vehicles.

The present application is a divsion of application Serial No. 83,361, filed on March 25, 1949, for Tandem Drive Mechanism.

Generally, it is an object of the invention to provide an improved tandem drive vehicle in which one of a pair of tandem wheels is rotatably mounted on an axle housing in vertically fixed position, and in which the other wheel of the pair is mounted on the axle housing for vertical movement relative thereto.

A further object of the invention is to provide an improved mounting for the vertically movable tandem wheel.

These and other objects and advantages are attained by the present invention, various novel features of which will be apparent from the description herein and the accompanying drawings disclosing an embodiment of the invention, and will be more particularly pointed out in the accompanying claims.

In the drawings:

Fig. 1 is a diagrammatic side view of a four wheel drive tractor, front and rear wheels at the near side of the tractor being omitted for purposes of exposure;

Fig. 2 is a top view of a link and other parts at the near side of the tractor shown in Fig. 1, portions of the link and associated parts in Fig. 2 being shown in section on line II—II of Fig. 1;

Fig. 3 is a sectional view, on line III—III in Fig. 1, of a tandem drive mechanism at the near side of the tractor shown in Fig. 1; and Fig. 4 is a schematic front view of the running gear and part of the main body of the tractor shown in Fig. 1.

Referring to Fig. 1, the running gear of the tractor comprises a pair of tandem wheels $W_1$ and $W_2$ at the far side of the tractor, and a corresponding pair of tandem wheels at the near side of the tractor, shown in Figs. 2 and 3. The main body of the tractor is generally indicated in Figs. 1 and 4 by the reference character 3, and the rear tandem wheels $W_1$ are rotatably mounted, as will be more fully explained hereinbelow with reference to Fig. 3, at the opposite ends of a transverse rear axle housing 4, which forms part of the main body 3. As indicated in Fig. 1, and as more clearly shown in Fig. 4, a transverse leaf spring 6 extends between the front tandem wheels $W_2$ and is pivoted at its center on a forward part of the main body 3 by means of a pin 5 which extends horizontally in the longitudinal direction of the tractor. The spring 6 is rockable on the axis of the pin 5 in conformity with well known principles as disclosed for instance in my U. S. Patent 1,429,449, dated September 19, 1922, for Main Frame and Suspension for Tractors.

As shown in Fig. 1, a support 7 for the near front tandem wheel $W_2$ is connected with the rear axle housing 4 by means of an upper link 8 and a lower link 9, and a corresponding support 7 (Fig. 4) is similarly connected by means of an upper and a lower link to the rear axle housing 4 at the far side of the tractor for mounting the other front tandem wheel $W_2$ as shown in Fig. 4, the opposite ends of transverse leaf spring 6 are connected in vertical load transmitting relation with the wheel supports 7, respectively, so as to sustain the main body 3 forwardly of the rear tandem wheels $W_1$ on the front tandem wheels $W_2$ and permit up and down swinging movement of the front tandem wheels independently of each other relative to the main body 3.

Referring to Fig. 2, the upper link 8 is constructed in the form of a tapered frame having a relatively wide rear end and a narrow front end, ball and socket joints 11 and 12 pivotally connecting the wide rear end of the link 8 with a pair of transversely spaced upper lugs 13 and 14 on the rear axle housing 4, and a transverse pivot pin 16 connecting the narrow front end of the link 8 with a pair of upper lugs 17 on the wheel support 7.

The lower link 9 is preferably constructed in the form of a rod having a ball and socket connection 18 at its rear end with a lower lug 19 of the rear axle housing 4, and a ball and socket connection 21 with a lower lug on the wheel support 7.

From the foregoing description of the construction and mounting of the upper and lower links 8 and 9, it will be seen that the links 8 and 9, at the near side of the tractor connect the wheel support 7 in vertically movable relation with the axle housing 4, and that the wheel support 7 is properly stabilized against toeing in and out and against lateral tilting relative to the main body 3. That is, lateral thrust forces to which the near wheel $W_2$ on the wheel support 7 becomes subjected during operation of the tractor, particularly during turning, and which tend to push the wheel and its support 7 toward or pull it away from the tractor main body, will be taken up by the link 8 and its pivot connections with the wheel support 7 and axle housing 4. The link 8 and its mentioned pivot connections effectively resist not only horizontal angular displacement of the wheel axis relative to the vehicle body which would result in toeing in or out of the wheel, but also vertical angular displacement of the wheel axis relative to the vehicle body which would result in lateral tilting of the wheel.

The wheel support 7 at the far side of the tractor (Fig. 4) is constructed and mounted in the same manner as the wheel support 7 at the near side of the tractor.

Referring to Fig. 3, an annular casing 22 which forms part of the rear axle housing 4, has a large axial end aperture, and a cover 23 for said aperture is rigidly secured to the casing 22 and has a central hub sleeve 24 which extends axially outward from the casing 22. The rear tandem wheel W1 is rotatably mounted on the hub sleeve 24 in axially fixed position by conical roller bearings 26 and 27. A quill shaft 28 which extends axially through the hub sleeve 24 and which is rotatable relative to the latter and relative to the wheel W1, has a circumferential series of axially extending splines 35 formed at its axially inner end. A bevel gear A is nonrotatably connected with the splined axially inner end of the quill shaft 28 within the casing 22, and the hub of the bevel gear A is rotatably mounted in the cover 23 and in a web 29 of the casing 22 by means of a roller bearing 30 and a double row ball bearing 31.

The rear axle housing 4 encloses a suitable power steering mechanism which is not shown but which, for instance, may be of the type generally used in crawler tractors for effecting steering by controlling the drive to the traction devices at the opposite sides of the tractor body.

As shown in Fig. 3, a rotatable drive shaft S extends axially through the quill shaft 28, and the axially outer end of the drive shaft S is mounted in axially fixed position on the rear wheel W1 by means of a ball bearing 25 for rotation relative to the rear wheel and relative to the quill shaft 28. The mentioned power steering mechanism (not shown) which is enclosed within the rear axle housing 4, is operable to control the transmission of engine power to the drive shaft S.

Integrally formed with the drive shaft S at the axially outer end of the latter is an externally toothed gear X which forms the sun gear of an epicyclic gear train within the rear wheel W1. A disk Y which is rigidly secured at its outer periphery to the rim of the rear wheel W1 forms the spider of the mentioned epicyclic gear train, and a ring gear Z which is rigidly connected with the axially outer end of the quill shaft 28 by means of a flange structure 32 forms a counter gear of the mentioned epicyclic gear train. A circumferential series of studs 33 are secured to the spider Y, and spur gears P which form planet pinions of the mentioned epicyclic gear train are rotatably mounted on the studs 33, each planet pinion meshing with the external teeth of the sun gear X and with the internal teeth of the ring gear Z.

As shown in the upper half of Fig. 3, a line shaft 34 is rotatably mounted on the casing 22 for rotation on an axis at right angles to the axis of the rear wheel W1, the line shaft 34 being rotatably supported in axially fixed position by means of a roller bearing 36 and a ball bearing 37 in an annular bearing support 38 which is rigidly secured to the casing 22 at the forward side of the latter. Integrally formed with the line shaft 34 is a bevel gear B which meshes with the bevel gear A within the casing 22.

The support 7 for the front wheel W2, as shown in Fig. 3, comprises a casing 41 and a cover 42 therefor which has a tubular central hub sleeve 43 on which the front wheel W2 is rotatably mounted in axially fixed position by means of conical roller bearings 44 and 46. An axle shaft 47 for the front wheel W2 extends through the hub sleeve 43 and has a spline connection at its axially outer end with a disk 48 which is secured at its periphery to the rim of the front wheel W2.

Another line shaft 49 is rotatably mounted on the front wheel support 7 for rotation on an axis at right angles to the axis of the front wheel W2, the line shaft 49 being rotatably supported in axially fixed position by means of a roller bearing 51 and a ball bearing 52 in an annular bearing support 53 which is rigidly secured to the casing 41 at the rear side of the latter. Integrally formed with the line shaft 49 is a bevel gear C which meshes with a bevel gear D on the axle shaft 47, the bevel gear D being connected by splines 48 with the axially inner end of the axle shaft 47 within the casing 41 and rotatably supported by means of a double row ball bearing 54 in a web 55 of the casing 41, and by means of a roller bearing 56 in the cover 42.

An intermediate line shaft section 57 is universally connected at its opposite ends with the line shafts 34 and 49, respectively, a universal joint 58 connecting the rear end of the intermediate line shaft section 57 with the forward end of the line shaft 34, and a universal joint 59 connecting the forward end of the intermediate line shaft section 57 with the rear end of the line shaft 49. The forward end of the line shaft 34 has a circumferential series of axially extending splines 60, and the universal joint 58 is mounted on the splined forward portion of the line shaft 34 for axial back and forth movement relative to the latter. The universal joint 59, on the other hand, is mounted on the rear end of the line shaft 49 in axially fixed position by means of a cross pin 50. The line shafts 34 and 49 together with the line shaft section 57 and universal joints 58 and 59 form a shaft connection between the axle housing 4 and the wheel support 7, for driving the front wheel W2, and which shaft connection is flexible and extensible so as to accommodate up and down movement of the wheel support 7 relative to the rear axle housing 4.

The foregoing explanations regarding the tandem drive mechanism at the near side of the tractor (Fig. 1) analogously apply to the tandem drive mechanism at the far side of the tractor (Fig. 4), and it will be understood that in operation of the tractor driving power may be applied selectively to the drive shaft S of the tandem drive mechanism at one side, or to the corresponding drive shaft S at the other side, or to both drive shafts simultaneously, in conformity with well known principles.

Considering the operation of the epicyclic gear train X, Y, Z and of the bevel gear train A, B, C, D during propulsion of the tractor, it will be noted that the epicyclic gear train not only serves as a differential between the wheels W1 and W2 but also as a transmission gearing between the drive shaft S and the wheels W1 and W2, whose gear ratio is different from unity. As shown in Fig. 3, the epicyclic gear train X, Y, Z is so proportioned that the gear ratio between the sun gear X and the counter gear Z, at zero speed of the spider Y, is larger than unity, and the bevel gear train A, B, C, D, is so proportioned that the gear ratio between the bevel gears A and D is substantially equal to the gear ratio which obtains between the counter gear Z and the spider Y at zero speed of the sun gear X. The rim diameter of the wheel $W_1$ is equal to the rim diameter of the wheel $W_2$, and during propulsion of the tractor on level ground the rim speed and the rim pull of the wheel $W_1$ will be substantially equal to the rim speed and rim pull of the wheel $W_2$. When the wheels $W_1$ and $W_2$ are thus driven at the same speed, such speed is substantially lower than the rotary speed of the drive shaft S, the total reduction ratio between the drive shaft S and the wheels $W_1$ and $W_2$ being twice as large as the reduction ratio which obtains between the drive shaft and one of the wheels when the other wheel is locked against rotation. In the mechanism as shown in Fig. 3, the reduction ratio between the drive shaft S and the wheel $W_1$, at zero speed of the wheel $W_2$, is equal to the reduction ratio between the sun gear X and the spider Y, and the total reduction ratio between the drive shaft S and both wheels $W_1$ and $W_2$ is twice the reduction ratio between the sun gear X and the spider Y.

In general terms, the tandem drive vehicle disclosed herein comprises a vehicle body having a rearward, transversely extending axle housing 4, a pair of rear wheels $W_1$ rotatably mounted, respectively, at opposite ends of said axle housing and in vertically nonswingable relation thereto, and parallel link mechanisms at opposite sides, respectively, of the vehicle body, each comprising a wheel support 7 and a pair of upper and lower links 8 and 9 operatively connecting the wheel support with the axle housing in vertically swingable relation thereto.

The vehicle further comprises a pair of front wheels $W_2$ which are rotatably mounted, respectively, on the wheel supports 7 and in tandem relation to the rear wheels $W_1$; a transverse equalizer element 6 which is pivoted at its center on a forward portion of the vehicle body and which bears at its opposite ends, respectively, upon the wheel supports 7; and means for transmitting driving power to said rear and front wheels at each side of the vehicle body, such means in the illustrated embodiment of the invention including two drive shafts S, two sets of planetary gearings X, Y, Z, and two bevel gear trains A, B, C, D.

A trapezoidal link member, as represented by the upper link 8, at either side of the tractor, has relatively wide and narrow end portions, and pivotal connecting means as represented by the ball and socket joints 11, 13 and 12, 14, between the axle housing 4 and the trapezoidal link member at the wide end portion of the latter, secure said link member for swinging movement on a first pivot axis extending longitudinally of the axle housing and transversely of the link member 8 from one of the converging sides thereof to the other. Another link member, as represented by the lower link 9, is pivotally secured at one end thereof to the axle housing 4 at a point of the latter, as shown at 18 in Fig. 1, in vertically spaced relation to the first pivot axis of the trapezoidal link member 8. The wheel support 7 and the trapezoidal link member 8 are connected with each other for relative swinging movement on a second pivot axis extending parallel to said first pivot axis by pivot means at the narrow end of the trapezoidal link member, and by complementary pivot means, such as the pin 16 on the wheel support 7. The other link member which in the illustrated embodiment of the invention is represented by the lower link 9, is connected at its other end with the wheel support 7 at a point on the latter in vertically spaced relation to the mentioned second pivot axis, such connection being afforded, in the illustrated embodiment of the invention by the ball and socket joint 21.

It should be understood that it is not intended to limit the invention to the hereinabove described forms and details, and that the invention includes such other forms and modifications as are embraced by the scope of the appended claims.

It is claimed and desired to secure by Letters Patent:

1. A tandem drive vehicle comprising, in combination, a vehicle body having a rearward, transversely extending axle housing, a pair of rear wheels rotatably mounted, respectively, at opposite ends of said axle housing in vertically nonswingable relation thereto, parallel link mechanisms at opposite sides, respectively, of said vehicle body, each comprising a wheel support and a pair of upper and lower links operatively connecting said wheel support with said axle housing in vertically swingable relation thereto, a pair of front wheels rotatably mounted, respectively, on said wheel supports and in tandem relation to said rear wheels, a transverse equalizer element pivoted at its center on a forward part of said vehicle body and bearing at its opposite ends, respectively, upon said wheel supports, and means for transmitting driving power to said rear and front wheels at each side of said vehicle body.

2. A tandem drive vehicle comprising, in combination, a vehicle body, a rear pair of power driven ground engaging traction wheels rotatably mounted on and in vertically nonswingable relation to said vehicle body, a front pair of power driven ground engaging traction wheels, a wheel support rotatably mounting one of said front pair of traction wheels at one side of said vehicle body, another wheel support rotatably mounting the other of said front pair of traction wheels at the other side of said vehicle body, a transverse equalizer element pivoted at its center on a forward part of said vehicle body and bearing at its opposite ends, respectively, upon said wheel supports, and parallel link mechanisms for mounting said wheel supports, respectively, on and in vertically swingable relation to said vehicle body, each of said parallel link mechanisms comprising a trapezoidal link member having relatively wide and narrow end portions, rear pivot means at the wide end of said link member and complementary rear pivot means on said vehicle body operative to mount said link member for vertical swinging movement on a rearward horizontal pivot axis extending transversely of said vehicle body and in the direction from one to the other of the converging sides of said link member, front pivot means at the narrow end of said link member and complementary front pivot means on the respective wheel support operative to connect said wheel support and said link member for relative swinging movement on a forward pivot axis extending parallel to said rearward pivot axis, another link member having a pivot connection at one of its ends with said vehicle body at a point on the latter in vertically spaced relation to said rearward pivot axis, and pivot means connecting said other link member at its other end with the respective wheel support at a point on the latter in vertically spaced relation to said forward pivot axis.

3. A tandem drive vehicle as set forth in claim 2, in which the trapezoidal link member of each of said parallel link mechanisms is connected at its wide end with said vehicle body by a pair of ball and socket joints having centers, respectively, aligned on and spaced from each other in the direction of said rearward pivot axis.

4. A tandem drive vehicle as set forth in claim 2, in which said other link member of each of said parallel link mechanisms is connected by a ball and socket joint with said vehicle body and by another ball and socket joint with the respective wheel support.

5. A tandem drive vehicle as set forth in claim 2, in which the trapezoidal link member of each of said parallel link mechanisms is connected at its wide end with said vehicle body by a pair of ball and socket joints having centers, respectively, aligned on and spaced from each other in the direction of said rearward pivot axis, and in which said other link member of each of said parallel link mechanisms is connected by a ball and socket joint with said vehicle body and by another ball and socket joint with the respective wheel support.

6. In a motor vehicle having a main body and tandem drive mechanisms at opposite sides, respectively, of said main body, the combination of a rear pair of driving wheels mounted on said main body for rotation on a transverse axis fixed vertically and horizontally relative to said body, parallel link structures mounted on said main body and presenting a pair of independently and vertically swingable front wheel supports at opposite sides, respectively, of said main body, a pair of front driving wheels rotatably mounted, independently of each other, on said front wheel supports, respectively, and spring means operatively interposed between said main body and said parallel link structures for sustaining said main body forwardly of said transverse axis; each of said parallel link structures comprising a pair of upper and lower link members, rear pivot means securing one of said link members in pivotal relation to said main body on an axis fixedly extending parallel to said transverse axis, and front pivot means connecting said one link member in pivotal relation to the respective front wheel support on another axis fixedly extending parallel to said transverse axis in all positions thereof.

7. In a motor vehicle having a main body and tandem drive mechanisms at opposite sides, respectively, of said main body, the combination of a rear pair of driving wheels mounted on said main body for rotation on a transverse axis fixed vertically and horizontally relative to said body, parallel link structures mounted on said main body and presenting a pair of independently and vertically swingable front wheel supports at opposite sides, respectively, of said main body, a pair of front driving wheels rotatably mounted, independently of each other, on said front wheel supports, respectively, and spring means operatively interposed between said main body and said parallel link structures for sustaining said main body forwardly of said transverse axis; each of said parallel link structures comprising a pair of upper and lower link members, rear pivot means securing said upper link member in pivotal relation to said main body on an axis fixedly extending parallel to said transverse axis, and front pivot means connecting said upper link member in pivotal relation to the respective front wheel support on another axis fixedly extending parallel to said transverse axis in all positions thereof, the effective axial width of said rear pivot means being greater than the effective axial width of said front pivot means.

EMIL F. NORELIUS.

REFERENCES CITED

The following references are of record in the file of this patent:

UNITED STATES PATENTS

| Number | Name | Date |
|---|---|---|
| 1,068,044 | Douglass | July 22, 1913 |
| 1,865,133 | Osman | June 28, 1932 |
| 1,891,642 | Harrison | Dec. 20, 1932 |
| 1,983,826 | Wilson | Dec. 11, 1934 |
| 2,135,619 | Johnston | Nov. 8, 1938 |

FOREIGN PATENTS

| Number | Country | Date |
|---|---|---|
| 282,017 | Great Britain | May 3, 1928 |